United States Patent Office 3,303,229
Patented Feb. 7, 1967

3,303,229
PREPARATION OF PHENYL ACETYLENE

Armand J. de Rosset, Clarendon Hills, Ill., assignor to Universal Oil Products Company, Des Plaines, Ill., a corporation of Delaware No Drawing. Filed May 15, 1964, Ser. No. 367,889
9 Claims. (Cl. 260—668)

This invention relates to a process for the preparation of unsaturated side-chain derivatives of aromatic compounds. More particularly, the invention is concerned with a process for preparing unsaturated side-chain derivatives of benzene.

When polymerizing certain olefinic compounds and particularly an aromatic compound containing an olefinic side chain, a specific example of which is styrene, it is desirable to incorporate a compound which will aid in cross-linking the styrene monomer to obtain a polymeric composition of matter which possesses desirable physical characteristics. One such compound which is a relatively good cross-linking agent comprises phenyl acetylene. However, a relatively serious drawback in using phenyl acetylene is that said compound is extremely dangerous to handle due, in part, to its unsaturated nature and volatility. Therefore, it is necessary to provide some means whereby phenyl acetylene may be utilized in a manner which is safer, both from the standpoint of the personnel engaged in the operation as well as the equipment which is to be utilized.

It is therefore an object of this invention to prepare phenyl acetylene in such a manner whereby said compound may be utilized in a relatively safe manner.

In a broad aspect one embodiment of this invention resides in a process for the preparation of phenyl acetylene which comprises contacting a phenylhaloethane at an elevated temperature and at a subatmospheric pressure with a dehydrohalogenation catalyst, and recovering the resultant product.

A further embodiment of this invention is found in a process for the preparation of phenyl acetylene which comprises halogenating ethylbenzene at an elevated temperature with a halogenating agent, recovering the resultant phenylhaloethanes, contacting said phenylhaloethanes at an elevated temperature and at a subatmospheric pressure with a dehydrocalogenation catalyst, and recovering the resultant products.

A specific embodiment of this invention is found in a process for the preparation of phenyl acetylene which comprises contacting phenyldibromoethane at a temperature in the range of from about 200° to about 650° C. and at a subatmospheric pressure with a catalyst comprising a magnesia, and recovering the resultant phenyl acetylene.

Another specific embodiment of this invention is found in a process for the preparation of phenyl acetylene which comprises brominating ethylbenzene at a temperature in the range of from about 125° to about 150° C. with bromine, recovering the resultant phenylbromoethanes, contacting said phenylbromoethanes at a temperature in the range of from about 200° to about 650° C. and at a subatmospheric pressure with a catalyst comprising magnesia, and recovering the resultant phenyl acetylene and styrene.

Other objects and embodiments will be found in the following further detailed description of this invention.

As hereinbefore set forth, the present invention is concerned with a process for preparing unsaturated side-chain derivatives of aromatic compounds and particularly to a process for preparing phenyl acetylene. Inasmuch as phenyl acetylene per se is relatively unstable, the presence of a solvent will permit the phenyl acetylene to be handled in an easier and safer manner. As one use of phenyl acetylene is as a cross-linking agent for styrene during the polymerization of styrene, it would be economically attractive to have the solvent or diluent also comprise styrene. In this respect it has now been discovered that a mixture of phenyl acetylene and styrene can be prepared using ethylbenzene as a starting material for the process. In the preferred embodiment of the invention, ethylbenzene is halogenated in the presence of a halogenating agent to prepare a mixture of phenylhaloethane and phenyldihaloethane; the preferred halogen comprises bromine and the preferred halogenating agent comprises elemental bromine. The halogenation, and preferably bromination, is effected at elevated temperatures ranging from about 125° to about 150° C., said bromine being present in a mole ratio of from about 2:1 to about 3:1 moles of bromine per mole of ethylbenzene.

Following the bromination of the ethylbenzene, the mixture of phenyldibromoethane and phenylbromoethane is then subjected to dehydohalogenation by contact with a dehydrohalogenation catalyst also at elevated temperatures. Suitable dehydrohalogenation catalysts which may be used include those which comprise an adsorbent composite comprising an oxide of a metal selected from the group consisting of magnesium, calcium, zirconium and zinc either per se or in admixtures thereof. It is also contemplated within the scope of this invention that the dehydrohalogenation, and particularly dehydrobromination, may be effected in the presence of a composition of matter comprising a catalytic-adsorbent composite whereby the hydrogen bromide which is a byproduct from the dehydrohalogenation reaction may be recovered from the reaction and thereafter oxidized to form elemental bromine which may then be used in the bromination step. Examples of these catalytic-adsorbent composites comprise copper oxide or cerium oxide deposited on an adsorbent composite comprising an oxide of magnesium, calcium or zinc. This catalytic-adsorbent composite may be prepared in any conventional manner; for example, the adsorbent support can be soaked, dipped or otherwise immersed in an ammonical solution of a soluble compound of copper or cerium, for example, copper nitrate, cerium nitrate, etc., for a suitable period of time after which the excess solution is evaporated or decanted therefrom. Following this the composite is then calcined at temperatures ranging from about 400° to about 700° C. for a suitable period of time. As hereinbefore set forth, the dehydrohalogenation is also effected at elevated temperatures ranging from about 200° to about 650° C. and, in addition, the reaction is also effected at subatmospheric pressures. These subatmospheric pressures will range from about 4 to about 150 mm. of mercury pressure.

The process of the present invention may be effected in any suitable manner and may comprise either a batch or continuous type of operation. For example, when a batch type operation is used, a quantity of ethylbenzene is placed in an appropriate apparatus such as an alkylation flask which may be provided with a reflux condenser, heating means, halogen addition means, etc. The flask is then heated to reflux temperature (approximately 136° C.). Following this a halogenating agent such as elemental bromine in a mole excess is added during a predetermined period of time. Upon completion of the residence time, the reaction product is recovered. This reaction product which comprises a mixture of halogenated ethylbenzenes which, for purposes of this invention, may be designated generically as "phenylhaloethanes," the term being used in the specification and appended claims to denote both phenylhaloethanes and phenyldihaloethanes, is recovered by fractional distillation.

The mixture is then charged to an apparatus which may comprise a column containing the desired dehydrohalogenation catalyst, said column being maintained at an elevated temperature in the range of from about 200° to about 650° C. and at a relatively low pressure in the range of from about 4 to about 150 mm. of mercury pressure. The dehydrohalogenated product comprising a mixture of phenyl acetylene and styrene which has been prepared concurrently is recovered, said mixture comprising a relatively stable solution which may, as hereinbefore set forth, be handled in a relatively safe and easy manner. If so desired, according to the type of catalyst which has been utilized in the dehydrobromination step of the process, the hydrogen bromide which is formed during the second step of the process may be recovered from the catalyst composite and thereafter oxidized in a conventional manner to form water and elemental bromine, the latter then being used for the first step of the process which comprises the bromination of ethylbenzene.

It is also contemplated within the scope of this invention that the process may be effected in a continuous manner. When this type of operation is used, the starting material comprising ethylbenzene and the halogenating agent such as elemental bromine are continuously charged to a reaction zone which is maintained at the proper operating conditions of temperature and pressure. The ethylbenzene undergoes halogenation to form the phenylhaloethanes. These compounds are continuously withdrawn and passed to a second reaction zone which contains a dehydrohalogenation catalyst. This catalyst comprises either an adsorbent such as magnesia or a magnesia-zirconia composite or, if so desired, may comprise an active catalytic adsorbent composite such as copper oxide composited on magnesia. This reaction zone is also maintained at the proper operating conditions which comprise an elevated temperature and a subatmospheric pressure. The phenylhaloethanes are continuously charged to the reaction zone and passed over the catalyst either in an upward or downward flow. Following a predetermined residence time in the reaction zone, the dehydrohalogenated compounds comprising a solution of phenyl acetylene and styrene are continuously withdrawn. The solution is then separated from any unreacted starting materials, the latter being recycled to form a portion of the feed stock while the former is recovered.

The following examples are given to illustrate the process of the present invention which, however, are not intended to limit the generally broad scope of the present invention in strict accordance therewith.

*Example I.*—To an alkylation flask which was equipped with an oil bath, bromine addition burette, thermometer, nitrogen bleed and a reflux condenser was charged 245.4 grams (2.38 moles) of ethylbenzene. The flask and contents thereof were then heated to a pot temperature of about 136° C. (reflux). Following this, 124 cc. (387 grams, 2.41 moles) of bromine was added during a period of about 2 hours, the pot temperature rising from 136° C. to about 142° C. The reaction mixture was allowed to stand for a period of about 16 hours following which an additional 110 cc. (343 grams, 2.15 moles) of bromine was added. During this time a nitrogen bleed removed any hydrogen bromide as it was formed. Upon completion of the reaction of the flask and contents thereof were allowed to cool to room temperature and the product was subjected to fractional distillation under reduced pressure. The crystalline heart cut which amounted to 76.7 wt. percent of the product and which boiled at a temperature in the range of from about 106° to about 108° at about 2 mm. pressure was recovered.

The crystalline heart cut obtained according to the above paragraph was then charged to a heated column containing 21.5 grams of magnesia, said column being maintained at a temperature of about 315° C. and a pressure of 20 mm. of mercury. The product, after recovery in an overhead receiver, was analyzed and found to contain phenyl acetylene and styrene.

*Example II.*—In this example 245.4 grams (2.38 moles) of ethylbenzene were charged to an alkylation flask similar to that hereinbefore described in Example I. The flask was heated to reflux (136° C.) and a total of 234 cc. (4.56 moles) of bromine was added thereto. At the end of the reaction time the flask and contents thereof were cooled to room temperature and the crude product was distilled under reduced pressure. The distillation yielded 18.6 wt. percent of a fore cut which comprised a mixture of crystals and mother liquid; 76.7 wt. percent of a crystalline heart cut and 14.7 wt. percent of bottoms.

A portion of the crystals from the heart cut obtained in the above paragraph are charged to a heated column containing a dehydrobromination catalyst comprising a magnesia-zirconia mixture. The heated column is maintained at a temperature of about 360° C. and a subatmospheric pressure of about 6 mm. of mercury. The charge is fed from a burette through the heated column and the desired product is recovered in a bottom receiver. The recovered product upon being analyzed will be found to contain a mixture of phenyl acetylene and styrene.

*Example III.*—In this example ethylbenzene is brominated in a manner similar to that set forth in the above examples, that is, by treating ethylbenzene with a molar excess of elemental bromine in an alkylation flask at a temperature of about 135° to about 145° C. The elemental bromine is added in two portions, the total amount of bromine used being approximately 2 moles per mole of ethylbenzene. Upon completion of the desired residence time the product is recovered and subjected to fractional distillation under reduced pressure.

The heart cut which is obtained from the fractional distillation referred to in the above paragraph is then dehydrohalogenated by feeding the heart cut to a column containing calcium oxide, said column being maintained at a temperature of about 600° F., and at a subatmospheric pressure of about 10 mm. of mercury. The charge passes upflow through the catalyst bed and is recovered in an overhead receiver. Upon analysis the product recovered will be found to contain a mixture of phenyl acetylene and styrene.

*Example IV.*—In this example a mixture of phenylbromoethane and phenyldibromoethane is prepared in a manner similar to that hereinbefore set forth, that is, by treating ethylbenzene with a 2:1 molar excess of bromine at a temperature in the range of from about 135° to about 145° C. The product recovered from this reaction is subjected to fractional distillation and the heart cut containing the aforementioned phenylbromoethane and phenyldibromoethane is then dehydrobrominated.

The dehydrobromination of the phenylbromoethanes is accomplished by charging these compounds in a reaction zone which is maintained at a temperature of about 350° C. and a subatmospheric pressure of about 10 mm. of mercury, said reaction zone containing a dehydrobromination catalyst comprising copper oxide composited on magnesia. The phenylbromoethanes are passed through said reaction tube in an upflow direction and recovered in an overhead receiver. Analysis of the recovered product will disclose the presence of phenyl acetylene and styrene.

Upon completion of the charge to the reaction zone, air will be passed through the catalyst which contains adsorbed hydrogen bromide thereon. The hydrogen bromide will be flushed off the catalyst while being oxidized to water and elemental bromine, the latter being recovered and reused as the brominating agent in the first step of the process.

I claim as my invention:

1. A process for the preparation of phenyl acetylene which comprises contacting a phenyldihaloethane at a temperature in the range of from about 200° to about 650° C. and at a subatmospheric pressure with a dehydrohalogenation catalyst comprising a solid adsorbent, and recovering the resultant product.

2. A process for the preparation of phenyl acetylene which comprises contacting a phenyldihaloethane at a temperature in the range of from about 200° to about 650° C. and at a subatmospheric pressure with a catalyst comprising magnesia, and recovering the resultant product.

3. A process for the preparation of phenyl acetylene which comprises contacting a phenyldihaloethane at a temperature in the range of from about 200° to about 650° C. and at a subatmospheric pressure with a catalyst comprising a magnesia-zirconia composite, and recovering the resultant product.

4. A process for the preparation of phenyl acetylene which comprises contacting a phenyldihaloethane at a temperature in the range of from about 200° to about 650° C. and at a subatmospheric pressure with a catalyst comprising calcium oxide, and recovering the resultant product.

5. A process for the preparation of phenyl acetylene which comprises contacting phenyldibromoethane at a temperature in the range of from about 200° to about 650° C. and at a subatmospheric pressure with a catalyst comprising magnesia, and recovering the resultant phenyl acetylene.

6. A process for the preparation of a solution of phenyl acetylene in styrene which comprises contacting a mixture of phenylmonohaloethane and phenyldihaloethane at a temperature in the range of from about 200° to about 650° C. and at a subatmospheric pressure with a dehydrohalogenation catalyst comprising a solid adsorbent, and recovering the resultant phenyl acetylene-styrene solution.

7. A process for the preparation of a solution of phenyl acetylene in styrene which comprises contacting a mixture of phenylmonobromoethane and phenyldibromoethane at a temperature in the range of from about 200° to about 650° C. and at a subatmospheric pressure with a dehydrobromination catalyst comprising a solid adsorbent, and recovering the resultant phenyl acetylene-styrene solution.

8. A process for the preparation of a solution of phenyl acetylene in styrene which comprises contacting a mixture of phenylmonobromoethane and phenyldibromoethane at a temperature in the range of from about 200° to about 650° C. and at a subatmospheric pressure with a catalyst comprising magnesia, and recovering the resultant phenyl acetylene and styrene in solution.

9. A process for the preparation of phenyl acetylene which comprises contacting a phenyldihaloethane at a temperature of from about 200° to about 650° C. and at a subatmospheric pressure with a dehydrohalogenation catalyst comprising an oxide of a metal selected from the group consisting of magnesium, calcium, zirconium and zinc, and recovering the resultant product.

References Cited by the Examiner

UNITED STATES PATENTS 3,204,004 8/1965 Sexton ............ 260—668

DELBERT E. GANTZ, *Primary Examiner.*

G. E. SCHMITKONS, *Assistant Examiner.*